US008828222B2

(12) United States Patent
Maiden (10) Patent No.: US 8,828,222 B2
(45) Date of Patent: Sep. 9, 2014

(54) PHOTOCATALYTIC INTERMITTENT FLOW-THROUGH PURIFICATION MODULE

(75) Inventor: Miles Maiden, Blue Hill, ME (US)

(73) Assignee: Hydro-Photon, Inc., Blue Hill, ME (US)

( * ) Notice: Subject to any disclaimer, the term of this patent is extended or adjusted under 35 U.S.C. 154(b) by 1001 days.

(21) Appl. No.: 12/823,729

(22) Filed: Jun. 25, 2010

(65) Prior Publication Data

US 2010/0258507 A1 Oct. 14, 2010

Related U.S. Application Data

(63) Continuation-in-part of application No. 12/624,204, filed on Nov. 23, 2009, now Pat. No. 8,226,831, which is a continuation of application No. 10/528,860, filed as application No. PCT/US03/30061 on Sep. 24, 2003, now Pat. No. 7,641,790.

(60) Provisional application No. 60/413,884, filed on Sep. 26, 2002, provisional application No. 60/417,584, filed on Oct. 10, 2002.

(51) Int. Cl.
| | |
|---|---|
| *C02F 1/32* | (2006.01) |
| *A45F 3/20* | (2006.01) |
| *C02F 1/00* | (2006.01) |
| *A45F 3/16* | (2006.01) |
| *C02F 1/72* | (2006.01) |

(52) U.S. Cl.
CPC ............ *A45F 3/20* (2013.01); *C02F 2201/326* (2013.01); *C02F 2201/3228* (2013.01); *C02F 1/32* (2013.01); *C02F 1/002* (2013.01); *A45F 2003/163* (2013.01); *A45F 2003/166* (2013.01); *C02F 1/003* (2013.01); *C02F 1/325* (2013.01); *C02F 1/725* (2013.01); *C02F 2201/009* (2013.01); *C02F 2201/3222* (2013.01); *C02F 2209/40* (2013.01); *C02F 2305/10* (2013.01); *C02F 2307/02* (2013.01)
USPC ........... 210/97; 210/192; 210/241; 422/186.3

(58) Field of Classification Search
None
See application file for complete search history.

(56) References Cited

U.S. PATENT DOCUMENTS

| | | | |
|---|---|---|---|
| 4,762,613 A | 8/1988 | Snowball | |
| 4,849,100 A | 7/1989 | Papandrea | |

(Continued)

FOREIGN PATENT DOCUMENTS

| | | |
|---|---|---|
| DE | 42 28 860 A1 | 3/1994 |
| WO | WO 97/38272 | 10/1997 |

(Continued)

OTHER PUBLICATIONS

Maiden, "UV LED Based Water Purification Module for Wearable Flow-Through Hydration Systems", U.S. Appl. No. 60/413,884, filed Sep. 26, 2002, 11 pages.

(Continued)

*Primary Examiner* — Terry Cecil
(74) *Attorney, Agent, or Firm* — Cesari and McKenna, LLP; Patricia A. Sheehan (57) ABSTRACT

A wearable or portable intermittently operable hydration system includes a purification module that contains one or more solid state light emitting devices that are positioned in the path of hydrating fluid, or water, flow through the hydration system to a mouthpiece. The light emitting devices illuminate a photocatalytic material disposed within the flow path in order to react and create fluid-purifying hydroxyls. The lights are instant on devices with essentially no ramp-up required, and a sensor or the opening of a push-pull valve controls the turning on of the lights. The fluid flow path may run from a bladder in a backpack worn by the user, a sports bottle worn by or carried by the user or may be through a water filtration system that a user operates via a pump. The power for the purification module may come from batteries, solar cells, fuel cells, or power converted from pumping, winding, etc.

9 Claims, 6 Drawing Sheets

(56) References Cited

U.S. PATENT DOCUMENTS

| | | |
|---|---|---|
| 4,899,057 A | 2/1990 | Koji |
| 5,032,241 A | 7/1991 | Robertson et al. |
| 5,167,819 A | 12/1992 | Iana et al. |
| 5,227,053 A | 7/1993 | Brym |
| 5,230,792 A | 7/1993 | Sauska et al. |
| 5,501,801 A | 3/1996 | Zhang et al. |
| 5,609,759 A * | 3/1997 | Nohren et al. ............... 210/266 |
| 5,780,860 A | 7/1998 | Gadgil et al. |
| 5,845,504 A | 12/1998 | LeBleu |
| 6,024,929 A | 2/2000 | Ichikawa et al. |
| 6,136,189 A * | 10/2000 | Smith et al. ................ 210/266 |
| 6,182,453 B1 | 2/2001 | Forsberg |
| 6,193,886 B1 | 2/2001 | Nohren, Jr. |
| 6,242,862 B1 | 6/2001 | Kawakatsu |
| 6,258,265 B1 * | 7/2001 | Jones ........................ 210/202 |
| 6,419,821 B1 | 7/2002 | Gadgil et al. |
| 6,461,520 B1 | 10/2002 | Engelhard et al. |
| 6,524,447 B1 | 2/2003 | Carmignani et al. |
| 6,633,042 B1 | 10/2003 | Funken et al. |
| 6,712,414 B2 | 3/2004 | Morrow |
| 7,327,087 B2 | 2/2008 | Wang |
| 7,615,512 B2 | 11/2009 | Orth-Gerber et al. |
| 7,641,790 B2 | 1/2010 | Maiden |
| 7,662,359 B2 | 2/2010 | Karvinen et al. |
| 7,666,926 B2 | 2/2010 | Nakayama et al. |
| 2003/0170151 A1 * | 9/2003 | Hunter et al. ............. 422/186.3 |
| 2005/0109708 A1 * | 5/2005 | Sheehan ..................... 210/748 |
| 2007/0125713 A1 | 6/2007 | Harris |
| 2009/0068496 A1 * | 3/2009 | Chang et al. ................ 428/702 |
| 2009/0075093 A1 | 3/2009 | Iversen |
| 2009/0092523 A1 | 4/2009 | Granqvist |
| 2010/0022385 A1 | 1/2010 | Scott |
| 2010/0038323 A1 | 2/2010 | Stenman |
| 2010/0052007 A1 | 3/2010 | Osawa |

FOREIGN PATENT DOCUMENTS

| | | |
|---|---|---|
| WO | WO 00/09449 | 2/2000 |
| WO | WO 02/12127 | 2/2002 |
| WO | WO 03065032 | 8/2003 |
| WO | WO 2004/028290 | 4/2004 |

OTHER PUBLICATIONS

Maiden, "UV LED Based Water Purification Module for Wearable Flow-Through Hydration Systems", U.S. Appl. No. 60/417,584, filed Oct. 10, 2002, 15 pages.

Maiden, "UV LED Based Water Purification Module for Intermittently Operable Flow-Through Hydration Systems", U.S. Appl. No. 12/624,204, filed Nov. 23, 2009, 23 pages.

Maiden, "UV LED Based Water Purification Module for Intermittantly Operable Flow-Through Hydration Systems", PCT Application No. PCT/US03/30061, filed Sep. 24, 2003, 21 pages.

* cited by examiner

FIG. 9

PHOTOCATALYTIC INTERMITTENT FLOW-THROUGH PURIFICATION MODULE

RELATED APPLICATIONS

The present application is a continuation-in-part of U.S. Pat. No. 8,226,831, filed on Nov. 23, 2009, now U.S. Pat. No. 8,226,831 for UV LED BASED WATER PURIFICATION MODULE FOR INTERMITTENTLY OPERABLE FLOW-THROUGH HYDRATION SYSTEMS, by Miles Maiden, which claims priority from U.S. Pat. No. 7,641,790, filed on Mar. 23, 2005, for UV LED BASED WATER PURIFICATION MODULE FOR INTERMITTENTLY OPERABLE FLOW-THROUGH HYDRATION SYSTEMS, by Miles Maiden, which claims priority from PCT/US03/30061, filed on Sep. 24, 2003 by Miles Maiden for a UV LED BASED WATER PURIFICATION MODULE FOR INTERMITTENTLY OPERABLE FLOW-THROUGH HYDRATION SYSTEMS, and which incorporated by reference and claimed the benefit of U.S. Provisional Patent Application Ser. Nos. 60/413,884 and 60/417,584, which were filed on Sep. 26, 2002 and Oct. 10, 2002, respectively, by Miles Maiden for a UV LED BASED WATER PURIFICATION MODULE FOR WEARABLE FLOW-THROUGH HYDRATION SYSTEMS, the contents of each of which are incorporated by reference herein in their entirety.

BACKGROUND OF THE INVENTION

1. Field of the Invention

The inventive system described herein uses visible light-activated photocatalytic technology to disinfect drinking water in intermittently operated flow-through hydration systems, such as wearable bladder bags. In such systems, water generally flows intermittently and on-demand from a bladder bag, or other "reservoir," through a tube and out into the user's mouth or, alternately, a drinking vessel.

2. Background Information

Currently, many water treatment systems use low pressure cold cathode fluorescent (CCFL) mercury vapor lamps with a primary radiative emission of 254 nanometers (2,537 angstroms). This wavelength, which falls within the short wave ultraviolet (UV) C band, is highly germicidal.

The CCFL UV lamps can be very effective in batch UV water purification systems, such as the system described in U.S. Pat. Nos. 5,900,212 and 6,110,424. However, the CCFL lamps are not well suited for wearable hydration systems. The lamps and their thermally insulating sleeves must be made from high quality, optical grade quartz, and thus, the CCFL UV lamp assemblies tend to be both costly and fragile. In addition, the CCFL UV lamps require high voltage AC power, and the circuitry needed to deliver this power is complex and relatively expensive, particularly if the input is from a DC source such as a battery.

The lamps also require a significant "warm-up" period during which lamp output is "ramps up" from zero to full power. During this "ramp-up" period, any water flowing past a CCFL UV lamp will not have predictable or uniform UV exposure. As a result, the efficacy of the treatment of water in such a flow-through system, from a micro-biological standpoint, becomes unpredictable and unreliable. For this reason, safety dictates that CCFL UV lamps be allowed to "ramp-up" to a steady-state output before water flow past the lamp is permitted. Achieving this steady-state output may take up to several minutes.

In a wearable flow-through hydration system or other intermittently operated on-demand flow-through systems, water consumption is not only intermittent but sudden and unpredictable. Accordingly, the CCFL UV lamps must, for safe operation, have been "ramped-up" to a steady state output before the water is allowed to flow past. The user must thus either keep the CCFL UV lamp on all the time or turn on the lamp for up to several minutes prior to each use, in order to allow for the "ramp-up" to steady state output. Neither of these scenarios is particularly desirable. In the first, the lamp must be kept on all the time and consumption of limited battery power quickly becomes a problem. In the second, the lamp must be turned on minutes before taking each drink and there is an obvious inconvenience.

SUMMARY OF THE INVENTION

The invention is a wearable or portable intermittently operable hydration system in which a water purification module containing one or more solid state light emitting devices, such as light emitting diodes (LEDs, generally), is positioned in the path of the flow of the hydrating fluid, such as water, from a container or reservoir through a tube or straw to a mouthpiece or other orifice. The purification module provides a path for the water past the one or more LEDs, where a portion of the path is coated with a fluid-purifying photocatalytic material. The lights may then be turned on to subject the photocatalyst to the light in order to purify the water. The photocatalytic layer may be coated on the walls of the purification module, or the LEDs themselves. In addition, the module and/or tube may be transparent, and the inner walls of the module or tube may be coated with the photocatalytic material in order to utilize exterior lighting sources (e.g., sunlight) for an additional and/or enhanced purification reaction.

The LEDs are "instant on" devices with essentially no ramp-up, and a sensor or is switch situated in the flow path signals the LEDs to turn on whenever the user initiates water flow through the path. The LEDs are also DC devices, and thus, require simpler, lower cost drive and control circuitry, than is required to operate CCFL lamps. Further, the LEDs are solid state devices and are thus less fragile than the CCFL lamps. Accordingly, the LEDs are well suited for intermittently operated wearable or portable flow-through hydration devices, such as wearable bladders, user-carried or worn sports water bottles, and so forth.

The DC power for the LEDs may be supplied by batteries, fuel cells and/or by solar cells, that is, photovoltaic panels, and the batteries and fuel cells and/or capacitors may be charged by solar cells. Further, a backpack that holds the system may be made from flexible photovoltaic material or material that supports or incorporates photovoltaic panels, and thus, provide power directly to the unit. Alternatively, the LEDs may be powered by windup or crank-type dynamos in addition to or in place of the batteries, cells and, in a black-out condition, grid power.

The purification module and associated water flow sensor may instead be positioned in a drinking straw, and thus, be used to purify water flowing through the straw from any type of water bottle, canteen and so forth, carried by the user. The purification module may additionally include a filter that removes sediment from the water. Alternatively, the purification module may be included in the tubing of a portable water filtering system, such as a pump system used by campers. The filter in such a system may then be relatively coarse, since the filter needs only to trap sediment and not microbes, which are destroyed by the purification module. Further, such a filtering system would not require use of chemicals. In addition, the pump action may be harnessed to power the LEDs, and batteries and the like may thus be eliminated.

BRIEF DESCRIPTION OF THE DRAWINGS

The invention description below refers to the accompanying drawings, of which.

DESCRIPTION OF EXAMPLE EMBODIMENTS

Figure 1:
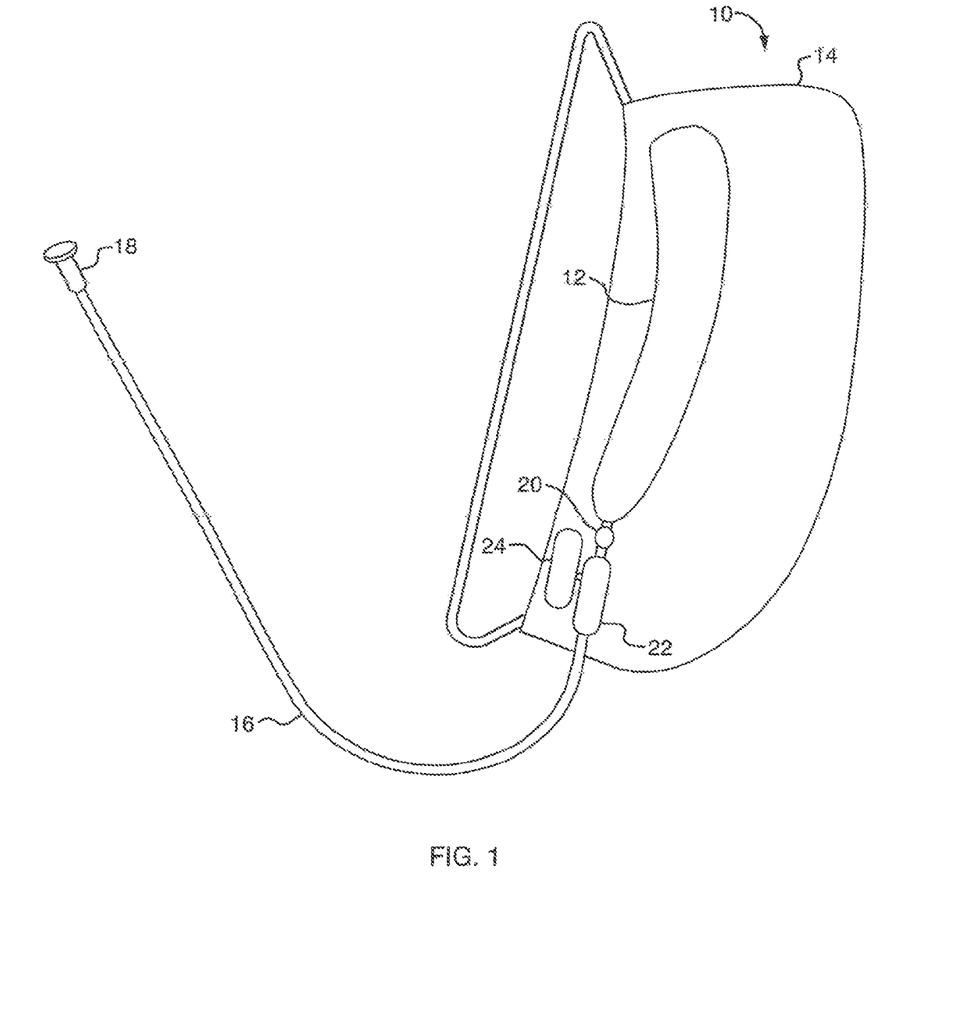
FIG. 1 is schematic representation of a wearable hydration system constructed in accordance with the current invention.

As shown in FIG. 1, a wearable flow-through hydration system 10 includes a bladder 12 that is contained in a backpack 14. The bladder supplies hydrating fluids, such as water, to a user through a tube 16 and mouthpiece 18. The tube includes a purification module 22 that ensures that the water is sufficiently purified by a purifying photocatalyst layer. As the water flows through the module 22, light activates a photocatalytic layer, described below, which produces purifying hydroxyls to destroy microbes present in the water, thus killing existing microbes and/or preventing microbial reproduction, therefore preventing infection. In addition, certain chemicals, organic and inorganic, may also be broken down by the hydroxyls, such as hydrocarbons, chlorine, etc. The purification module 22 is discussed in more detail below with reference to FIGS. 2-4.

When a user requires water from the bladder 12, the water is drawn out of the bladder and flows past a water flow sensor 20. When the water flow sensor senses the flow, the sensor switches on the purification module 22. A power supply 24 supplies power, e.g., between 6 and 9 volts DC power, to the purification module, and as discussed in more detail below, one or more solid state lights, such as, visible light or ultraviolet (UV) light emitting diodes ("LEDs"), turn on to illuminate the photocatalytic layer to purify the water as the water flows through the purification module.

Figure 2:
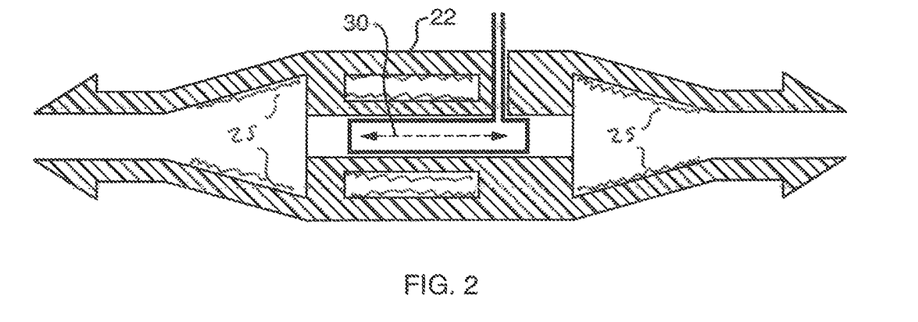
FIGS. 2-4 depict in more detail a purification module included in the system of FIG. 1.
Figure 3:
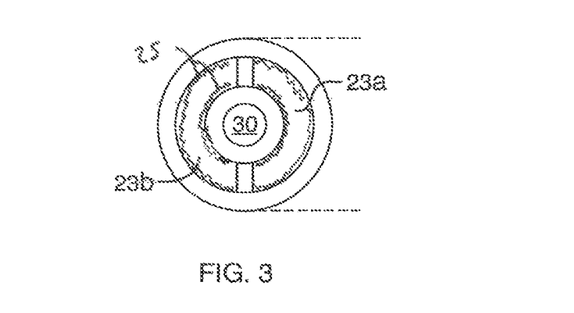
Figure 4:
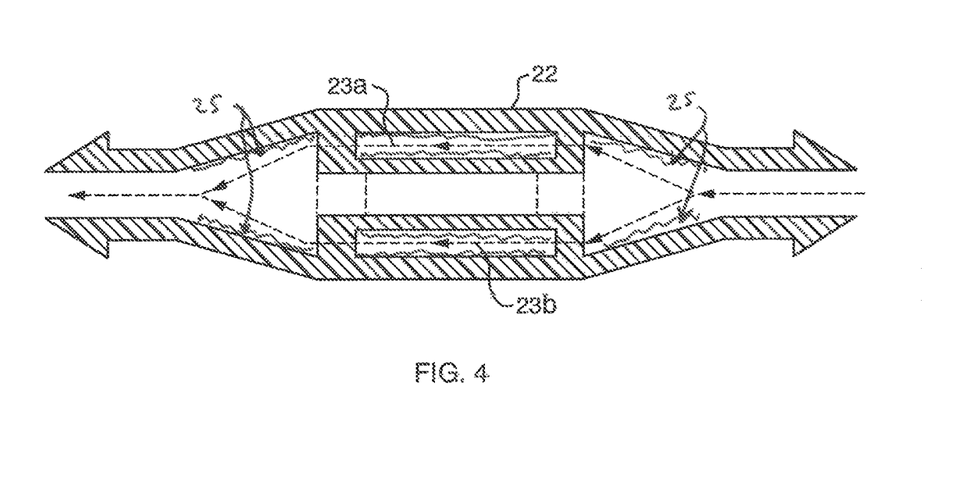

Referring now to FIGS. 2-4, the purification module 22 includes an LED unit 30 that preferably contains a plurality of LEDs (not shown individually), which may comprise visible light LEDs and/or UV LEDs of a suitable wavelength to activate a photocatalytic material 25. The module 22 is positioned in the tube 16 such that water flows on paths 23a and 23b largely surrounding the unit 30. The dimensions of the purification module 22 and the associated section of the tube 16 are such that water flowing past the walls of the module, which may be coated with the photocatalytic material 25, is no further than a maximum effective distance away from the illuminated photocatalysts.

In particular, according to one or more embodiments of the present invention, a photocatalytic material may be applied to all or part of the interior surface of the purification module 22. In this manner, when the fluid flows through paths 23a and 23b, the light from unit 30 serves to activate the photocatalyst 25, which may be located on the interior walls of the purification module (paths 23a and 23b) and/or on the LED unit 30 itself. The activated photocatalyst, which is in contact with the drinking water, produces hydroxyl radicals that destroy pathogens that they contact.

Example photocatalysts may include a titanium dioxide ($TiO_2$) compound or any other photocatalyst materials known to suitably purify fluid (e.g., water) when exposed to visible and/or UV light. In particular, in accordance with one aspect of the invention, the photocatalysts may be doped with various additives (e.g., palladium, nitrogen, etc.) in order to enhance the material's ability to produce purifying radicals in reaction to certain types of light.

Notably, the longer the activated photocatalyst is in contact with the fluid/water, the more hydroxyl radicals are produced, and thus the greater the degree of purification. As such it may be beneficial to create a serpentine path for paths 23a and 23b, or an extended flow length (higher surface area contact), such that sufficient purification can occur. Note further that additional exterior lighting, such as sunlight or artificial light, may enter a transparent tube 16 coated with further photocatalysts or the module 22 may itself be transparent to allow external light to further illuminate the photocatalytic layer 25. Note also that in certain embodiments, the exterior lighting may illuminate the photocatalytic layer sufficiently to purify the flowing fluid without internal lighting from LED unit 30.

Additionally, as shown in the drawings, the module 22 may be widened where the LED unit 30 resides, such that water flow is not impeded by having to flow around, that is, on the paths 23a and 23b on either side of, the LED unit. This prevents a backing up or other interruption of the water flow through the tube 16 to the user.

Unlike CCFL UV lamps, LEDs are "instant on" devices meaning that their output reaches steady state in micro or nanoseconds. Also, unlike fragile CCFL UV lamps, LEDs are robust solid state devices which do not require low pressure gas mixtures that can leak and fail. In addition, LEDs are DC devices which require simple, low cost drive and control circuitry, as compared with the much more expensive and involved high voltage ballast circuitry of CCFL lamps.

In a wearable flow-through hydration system, where water is drawn periodically and unpredictably, LED based purification has a further advantage over CCFL UV systems. With "instant on" and no need for a "ramp-up" period, and thus, the LEDs can be activated only as needed, i.e., while water is being drawn. When water is not being drawn, the LEDs are off and no power is consumed. The photocatalytic layer 25 also responds substantially instantaneously to the LED's light, further benefiting the intermittent flow-through system described herein.

Figure 5:
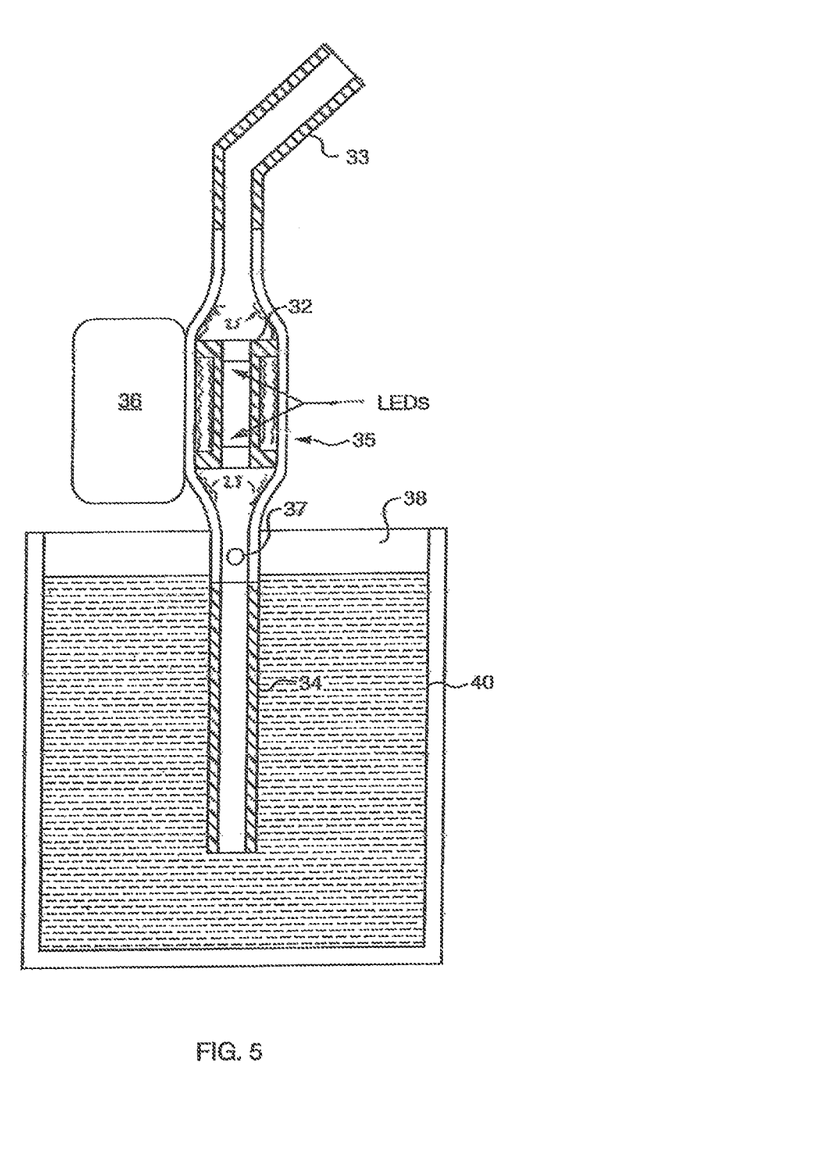
FIG. 5 is a schematic drawing of an alternative system that includes the purification module in a drinking straw.

A "drinking straw" embodiment of the invention is shown in FIG. 5. A flow-through purification module 32 is connected in line between the mouthpiece 33 and the tailpiece 34 of a drinking straw generally indicated at 35. The module is of the same construction as the module 22 of FIGS. 1-4, with an attached power supply 36. A flow sensor 37 is disposed below the module 32. In the illustration the drinking straw has been inserted through the cover 38 of a container 40 containing a liquid such as water. The user imbibes the liquid as she would through a conventional drinking straw, with the "instant on" feature of the purifier module purifying the water on-demand as the water flows through the module.

Figure 6:
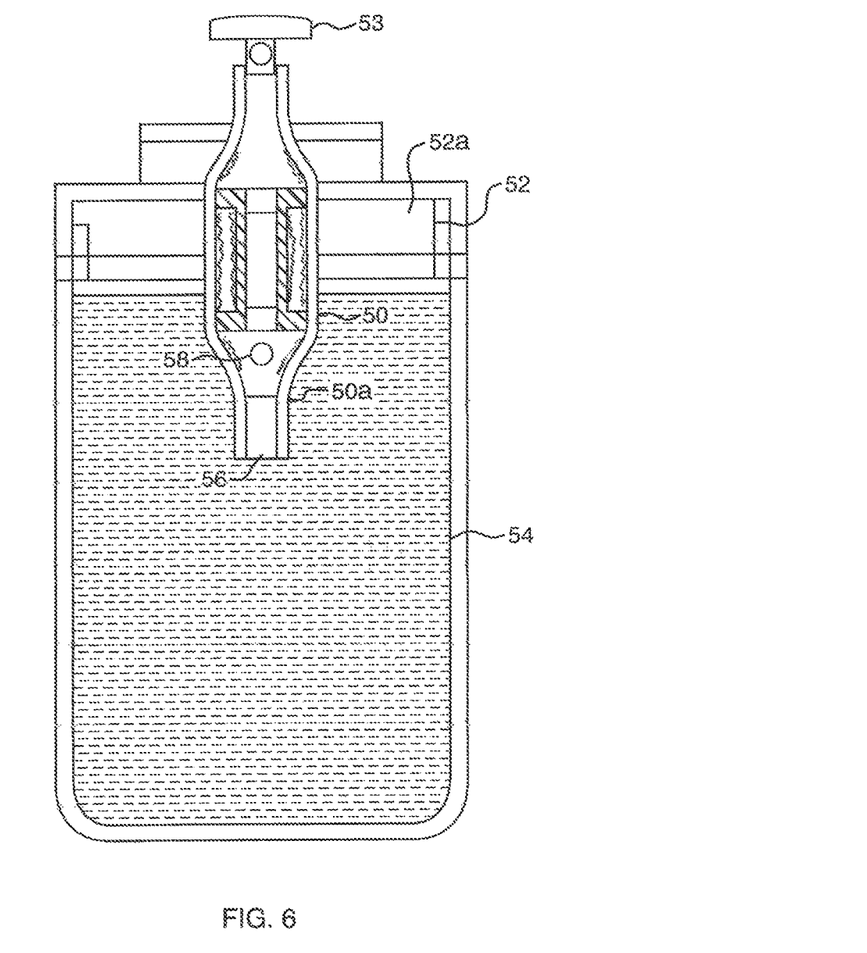
FIG. 6 is a schematic drawing of a system in which the purification module is included in a bottle top.

In FIG. 6 a purification module 50 has been combined with a bottle top 52 that contains a power supply (not shown) in a cavity 52a. The upper end of the module 52 is terminates in a "push-pull" valve 53 of the type often used by cyclists, hikers, etc. The lower end of the module, which extends into the bottle 54 to which the top 52 is attached, may carry an optional filter 56 for removal of particles entrained in the water entering the module 50. The sensor 58 may be eliminated, and the push-pull operation of the valve 53 may instead be used to control the turning on of the LEDs to illuminate a photocatalytic layer within the module 52, with the pulling or opening of the valve turning on the purification module. Alternatively, valve 53, in this embodiment or any of the others, may be embodied as a "bite valve," which when bitten opens to allow the flow of fluid.

Figure 7:
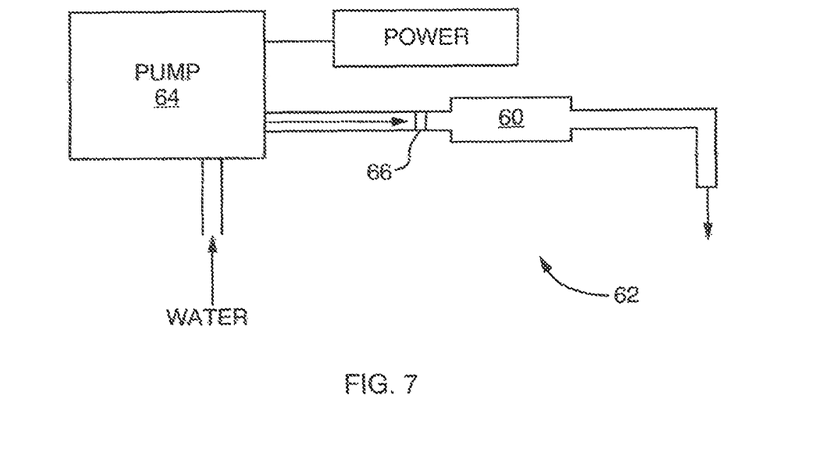
FIG. 7 is a functional block diagram of a portable water filtration system constructed in accordance with the invention.

FIG. 7 depicts a purification module 60 in use in a portable water filtration system 62, such as those used by campers. The purification unit destroys microbes in the water that is pumped through the system via pump 64, while one or more filters 66 remove sediments from the water. The pump action may also provide power to the LEDs through the power supply 68, which operates in a known manner to convert pumping action to DC power. In such a filtration system, a water flow sensor is not required, since the power supply utilizes pumping action and thus does not provide power to the LEDs unless the pump is operated to draw water through the system. The one or more filters need not be as fine as those used in conventional water filtration systems, since the filters need not trap the microbes or certain chemicals, which are instead destroyed or otherwise broken down by the photocatalytic reaction. Further, the water filtration system does not require the chemicals used in conventional filtration systems.

The power supplies discussed above may include conventional batteries or solar cells, that is, photovoltaic panels. Alternatively, the power supply may include batteries, fuel cells or capacitors that are charged by solar cells, and/or windup or crank-type dynamos. Further, the backpack 14 (FIG. 1) that holds the system may be made from flexible photovoltaic material or made of material that supports or incorporates the photovoltaic panels, and thus, provide power directly to the unit. Similarly, a carrier (not shown) for the bottle 54 (FIG. 6) may be made from, support or incorporate photovoltaic material. In addition or instead, the bottle top 52 may be made relatively inflexible photovoltaic material or support one or more photovoltaic panels. Alternatively, the LEDs may be powered by windup or crank-type dynamos (not shown) in addition to or in is place of the batteries, cells and, in a black-out condition, grid power.

Figure 8:
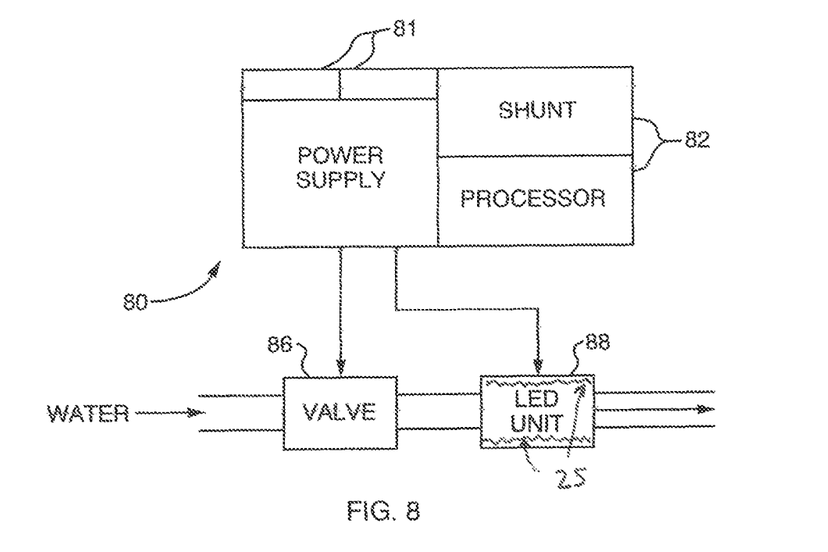
FIG. 8 is a functional block diagram that depicts in more detail a power supply that may be included in the system of FIG. 1.

Referring now to FIG. 8, when solar cells are used, the power supply 80 preferably includes a current shunt 82 that is coupled to a microcontroller 84, for measuring the current supplied to the LEDs and calculating the dose, which is proportional to the current. That is, the photocatalytic reaction is based on the amount of light received at the photocatalytic layer, and hence based on the amount of light output from the LEDs. When there are fluctuations in solar energy, such as when a cloud covers the sun, the microcontroller may impede the flow of the water, to provide longer periods of exposure to the purification module by controlling the amount by which a valve 86 opens to allow water flow past the LEDs and photocatalytic material in unit 88. The microcontroller may instead prevent the water from flowing through the purification module until sufficient current can be supplied. As appropriate, the unit may be switched from, for example, solar power to backup battery power at appropriate times by the microcontroller and/or the user.

Figure 9:
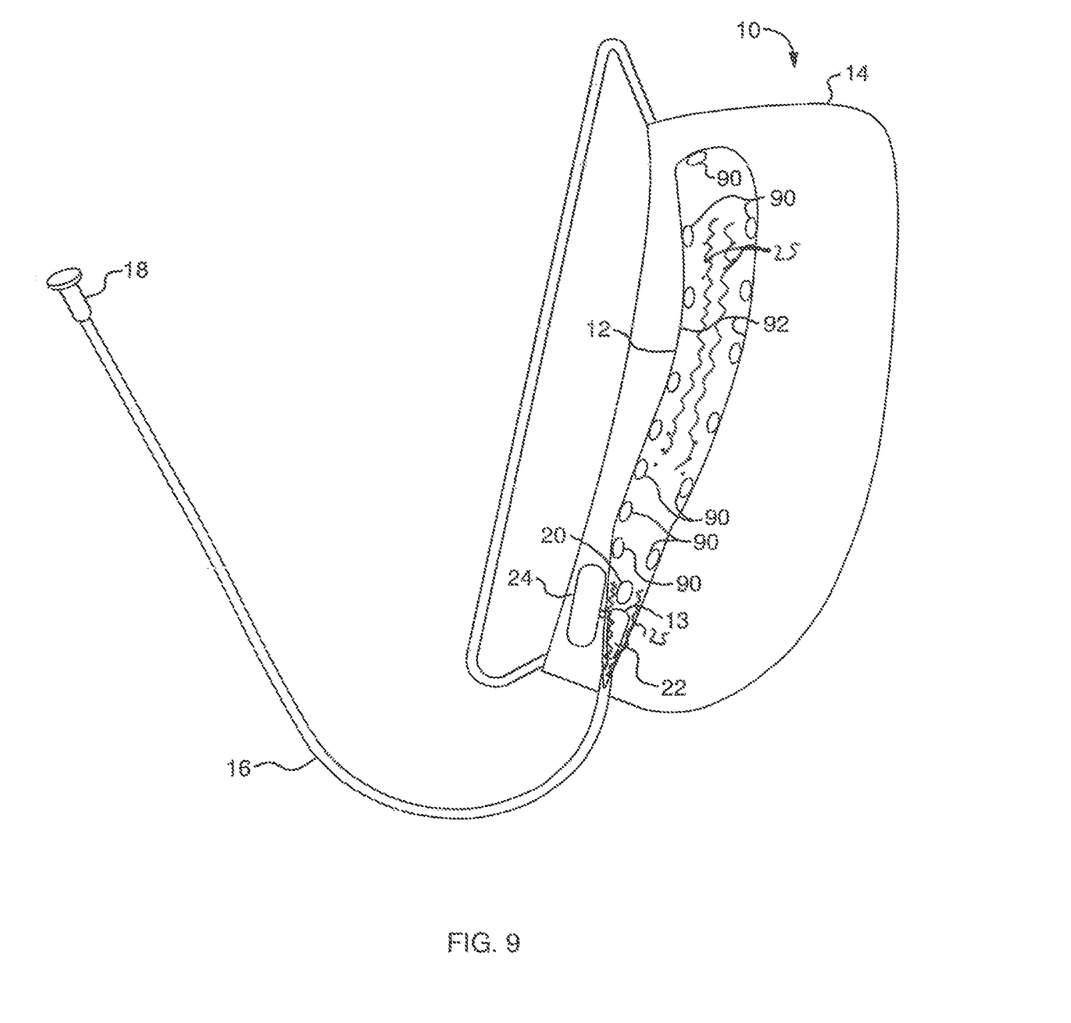
FIG. 9 is a schematic drawing of an alternative to the system depicted in FIG. 1.

As depicted in FIG. 9, the LED unit 22 may instead be positioned in the narrowing channel 13 that connects the bladder 12 to the tubing 16, with the LEDs turning on when water flows through the channel. In this embodiment, the narrowing channel 13 may be coated with the photocatalytic material 25. Alternatively or in addition, LEDs 90 may be positioned facing inwardly in the walls 92 of the bladder or in the area proximate to the channel 13 to supply light to a photocatalytic coating on the inside of the bladder. The LEDs in the walls may, for example, be turned on when associated solar cells have stored sufficient energy, as a precaution against changing environmental conditions that might otherwise disrupt the power to the LEDs. As appropriate, the treated water may then flow through the purification module as discussed above and be subject to further photocatalytic purification, assuming the solar cells are sufficiently charged. Alternatively, the water may be diverted around the unit or flow through the unit without further treatment. A similar arrangement and operation of the wall-mounted LEDs and photocatalytic layer may be used in the water bottle 54 depicted in FIG. 6.

In the embodiments described above, the water flow sensors may be replaced with is user-activated switches that a user turns on to activate the LEDs in the LED unit 30 when, for example, the user desires to take a drink. Further, automatic or user-activated switches may be included to actuate the LEDs 90 in the walls of the containers at desired times, such as when sufficient solar power is available or it is convenient for the user to operate a dynamo, and so forth.

In summary, the LED and photocatalytic purification system described above has numerous advantages. The purification system is less costly, more robust, less complicated, more convenient, and less power-consuming than CCFL technology. It also has the potential to be smaller and lighter than CCFL technology. Further, the LED purification system is particularly well suited for intermittent on-demand use. Accordingly, the system is well suited for use in wearable or portable hydration devices.

What is claimed is:

1. A purifying drinking straw, consisting of:
   an inlet tube configured to be placed in hydrating fluid from a fluid source;
   an outlet tube configured as a mouthpiece;
   a power supply;
   a purification module located between the inlet tube and outlet tube, the purification module having: i) a flow path from the inlet tube to the outlet tube, the flow path arranged to allow the hydrating fluid to flow at a drinkable rate through the drinking straw; ii) one or more solid state light emitting devices to provide light within the flow path; and iii) a photocatalytic material disposed on a surface within the flow path, the photocatalytic material configured to produce fluid-purifying hydroxyls when exposed to light, the light emitting devices and photocatalytic material arranged with the flow path such that hydrating fluid that flows past the photocatalytic material at the drinkable rate is purified by the fluid-purifying hydroxyls;
   means for turning on the light emitting devices in response to hydrating fluid flow through the purification module to the mouthpiece, the photocatalytic material substantially immediately reaching a state of hydroxyl output when illuminated sufficient to purify the hydrating fluid as it flows past the photocatalytic material at the drinkable rate such that no unpurified hydrating fluid reaches the mouthpiece; and
   means for turning off the light emitting devices in response to the hydrating fluid no longer flowing to the mouthpiece.

2. The purifying drinking straw as in claim 1, wherein the means for turning the light emitting devices on and off is a fluid sensor.

3. The purifying drinking straw as in claim 1, wherein the means for turning the light emitting devices on and off is a user input.

4. The purifying drinking straw as in claim 3, wherein the user input is opening and closing of a user-activated mouthpiece.

5. The purifying drinking straw as in claim 1, wherein the means for turning the light emitting devices on and off is a flow sensor.

6. The purifying drinking straw as in claim 1, wherein the light emitted by the light emitting devices is selected from a group consisting of a visible light and an ultraviolet (UV) light.

7. The purifying drinking straw as in claim 1, wherein the photocatalytic material is a titanium dioxide ($TiO_2$) compound.

8. The purifying drinking straw as in claim 1, wherein the photocatalytic material is disposed on the walls of the flow path.

9. The purifying drinking straw as in claim 1, wherein the photocatalytic material is disposed on the light emitting devices.

\* \* \* \* \*

UNITED STATES PATENT AND TRADEMARK OFFICE
CERTIFICATE OF CORRECTION

| | |
|---|---|
| PATENT NO. | : 8,828,222 B2 |
| APPLICATION NO. | : 12/823729 |
| DATED | : September 9, 2014 |
| INVENTOR(S) | : Miles Maiden |

It is certified that error appears in the above-identified patent and that said Letters Patent is hereby corrected as shown below:

In the Specification:
Col. 1, line 56 should read:
during which lamp output "ramps up" from zero to full

Col. 2, line 36 should read:
ramp-up, and a sensor or switch situated in the flow path Col. 4, line 66 should read:
cavity 52*a*. The upper end of the module 52 terminates in a Col. 5, line 43 should read:
(not shown) in addition to or in place of the batteries, cells Col. 6, line 18 should read:
sors may be replaced with user-activated switches that a Signed and Sealed this
Tenth Day of February, 2015

Michelle K. Lee
*Deputy Director of the United States Patent and Trademark Office*